United States Patent
Connaulte et al.

(10) Patent No.: US 9,045,223 B2
(45) Date of Patent: Jun. 2, 2015

(54) METHOD OF ASSISTING A PILOT OF A SINGLE-ENGINED ROTARY WING AIRCRAFT DURING A STAGE OF FLIGHT IN AUTOROTATION

(71) Applicant: AIRBUS HELICOPTERS, Marignane, Cedex (FR)

(72) Inventors: Matthieu Connaulte, Eguilles (FR); Christian Mercier, La Fare les Oliviers (FR); Damien Mariotto, Lambesc (FR)

(73) Assignee: Airbus Helicopters, Marignane Cedex (FR)

( * ) Notice: Subject to any disclaimer, the term of this patent is extended or adjusted under 35 U.S.C. 154(b) by 273 days.

(21) Appl. No.: 13/969,666

(22) Filed: Aug. 19, 2013

(65) Prior Publication Data
US 2014/0054411 A1    Feb. 27, 2014

(30) Foreign Application Priority Data
Aug. 27, 2012    (FR) ..................... 12 02304

(51) Int. Cl.
*B64C 19/00* (2006.01)
*B64C 27/00* (2006.01)
*B64C 27/14* (2006.01)
(Continued)

(52) U.S. Cl.
CPC ............ *B64C 27/006* (2013.01); *B64C 27/14* (2013.01); *B64D 27/24* (2013.01); *B64D 31/00* (2013.01); *B64D 35/02* (2013.01); *B64D 35/08* (2013.01); *B64D 2027/026* (2013.01); *Y02T 50/64* (2013.01); *Y02T 50/44* (2013.01)

(58) Field of Classification Search
CPC ................. B64C 19/00; G06F 17/00
USPC .................. 701/29.1, 14; 244/17.13
See application file for complete search history.

(56) References Cited

U.S. PATENT DOCUMENTS

| 4,028,001 | A | * | 6/1977 | Watson ............ 416/134 A |
| 8,181,901 | B2 |  | 5/2012 | Roesch |

(Continued)

FOREIGN PATENT DOCUMENTS

| EP | 2148066 A1 | 1/2010 |
| EP | 2327625 A1 | 6/2011 |

(Continued)

OTHER PUBLICATIONS

Search Report and Written Opinion; Application No. FR 1202304; dated May 23, 2013.

*Primary Examiner* — Tan Q Nguyen
(74) *Attorney, Agent, or Firm* — Brooks Kushman P.C.

(57) ABSTRACT

A method of assisting a pilot of a single-engined rotary wing aircraft (1) during a stage of flight in autorotation, said aircraft (1) including a hybrid power plant having an engine (13), an electric machine (12), and a main gearbox (11). Said aircraft (1) also includes electrical energy storage means (14) and a main rotor (2) mechanically connected to said hybrid power plant (5). According to said method, while in flight, the operation of said engine (13) is monitored in order to detect a failure thereof, in particular by monitoring for a drop of power on said main rotor (2), and then in the event of a failure of said engine (13) being detected, said electric machine (12) is controlled to deliver auxiliary power $W_e$ to said main rotor (2), thereby enabling the pilot of said aircraft (1) to be assisted in maneuvering said aircraft (1) during said stage of flight in autorotation following said failure.

17 Claims, 2 Drawing Sheets

(51) Int. Cl.
　　　*B64D 27/24*　　　(2006.01)
　　　*B64D 31/00*　　　(2006.01)
　　　*B64D 35/02*　　　(2006.01)
　　　*B64D 35/08*　　　(2006.01)
　　　*G06F 17/00*　　　(2006.01)
　　　*B64D 27/02*　　　(2006.01)

(56) References Cited

U.S. PATENT DOCUMENTS

| | | |
|---|---|---|
| 8,283,796 B2 | 10/2012 | Certain |
| 8,464,980 B2 | 6/2013 | Certain |
| 8,469,306 B2 | 6/2013 | Kuhn |
| 2009/0145998 A1 | 6/2009 | Salyer |
| 2012/0025032 A1 | 2/2012 | Hopdjanian |
| 2012/0241553 A1* | 9/2012 | Wilke .................. 244/17.13 |
| 2013/0082135 A1* | 4/2013 | Moret .................. 244/6 |

FOREIGN PATENT DOCUMENTS

| | | |
|---|---|---|
| FR | 2916418 A1 | 11/2008 |
| FR | 2962404 A1 | 1/2012 |
| WO | 2010123601 A1 | 10/2010 |

* cited by examiner

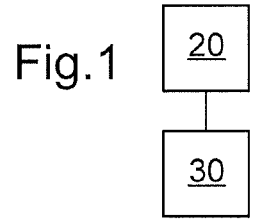
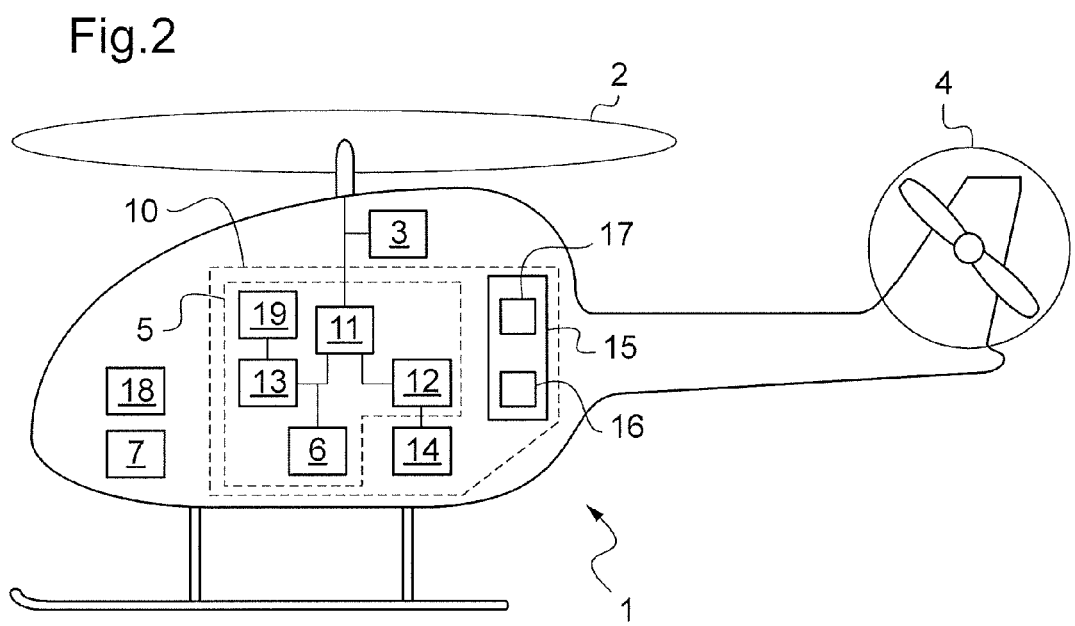
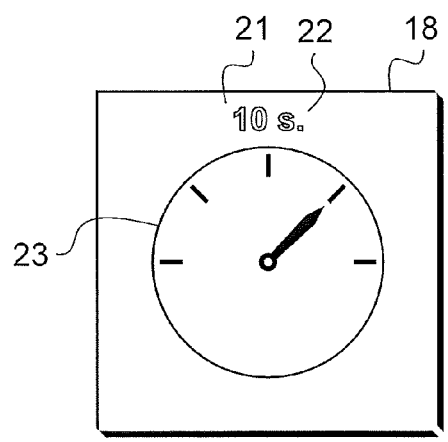

METHOD OF ASSISTING A PILOT OF A SINGLE-ENGINED ROTARY WING AIRCRAFT DURING A STAGE OF FLIGHT IN AUTOROTATION

CROSS REFERENCE TO RELATED APPLICATIONS

This application claims priority to French patent application No. FR 12 02304 filed on Aug. 27, 2012, the disclosure of which is incorporated in its entirety by reference herein.

BACKGROUND OF THE INVENTION (1) Field of the Invention

The present invention lies in the technical field of power plants for single-engined rotary wing aircraft. The invention relates to a method of assisting a pilot of a single-engined rotary wing aircraft during a stage of flight in autorotation. The invention also provides a single-engined rotary wing aircraft including a device for assisting a pilot of the aircraft during a stage of flight in autorotation.

(2) Description of Related Art

A rotary wing aircraft is conventionally provided with at least one main rotor for providing it with lift and possibly also with propulsion, and is generally also provided with a tail rotor, in particular for opposing the yaw torque that is exerted by the main rotor on the fuselage of the aircraft, and that is also used to control yaw movements of the aircraft.

In order to drive rotation of the main rotor and of the tail rotor, the aircraft has a power plant that may include one or more engines.

A distinction is drawn in particular between aircraft of the "single-engined" type in which the power plant has only one engine for driving the main rotor and the tail rotor, and aircraft of the "two-engined" type where the power plant has two engines for this purpose.

It should be observed that throughout this specification, the term "engine" is used to designate a fuel-burning engine such as a turboshaft engine or a piston engine of the kind suitable for use in such a power plant. The term "engine" should be contrasted with the term "motor" where the motor may be driven by electrical power, pneumatic power, etc.

Single-engined aircraft have non-negligible advantages compared with aircraft provided with at least two engines. By way of example, mention may be made of reasonable costs, reduced maintenance operations, and relatively smaller fuel consumption.

Nevertheless, such single-engined aircraft also present drawbacks.

In the event of the single engine being damaged, the power plant, and consequently the single-engined aircraft, presents performance that is degraded, and in the event of the engine failing that can amount to the inability to drive the main rotor and the tail rotor, which leads to a situation that is dangerous, significantly increasing the workload on the pilot of the aircraft. During such a failure, since the main rotor is no longer driven by the power plant, the pilot must begin by entering into a stage of flight in autorotation, and must then perform an emergency landing with the main rotor in autorotation.

A stage of flight in autorotation corresponds to a particular stage of flight in which the aircraft flies, descending without any driving power, but at the cost of a sink rate that is rather large. The term "sink rate" is used to designate the amount of height the aircraft loses per unit time, with this loss of height generally being expressed in feet per minute (ft/min). For example, the descent rate of a single-engined aircraft in autorotation is about 1500 ft/min.

Under such circumstances, the main rotor is caused to rotate by the stream of air passing through it, without making use of a source of energy, and thereby allowing the aircraft to remain maneuverable. When the main rotor is driven in rotation by the relative wind, it remains the seat of stabilized lift that, although less than the weight of the aircraft, nevertheless remains sufficient to brake the descent of the aircraft and to retain control over the aircraft until it has landed.

However, the pilot needs to apply a special piloting procedure and needs to be very attentive firstly to begin by entering into a stage of autorotation when the failure appears, and secondly to continue by performing this always-difficult maneuver all the way to landing. Furthermore, in order to maneuver the aircraft in complete safety during this stage of flight in autorotation and until an emergency landing has been made in an appropriate area, the workload on the pilot is increased. This particular procedure requires great precision and special and frequent training on the part of the pilot of the aircraft. It is a difficult part of piloting aircraft, in particular single-engined aircraft, and is one of the main reasons for which the flight envelope and the use of an aircraft of this type are reduced.

The flight envelope and the missions that are authorized for single-engined aircraft are reduced by the certification authorities that authorize flight. For example, it is forbidden to overfly a large built-up area with a single-engined aircraft. Likewise, the capacities authorized for single-engined aircraft, such as maximum onboard weight, may be limited compared with their real capacities.

One possible solution for improving the performance of single-engined aircraft in this context is the use of a so-called "hybrid" power plant.

In a manner similar to land vehicles, a "hybrid" power plant comprises at least one engine together with at least one electric motor, the mechanical power from the hybrid power plant being delivered either by the engine on its own, or by the electric motor on its own, or by both of them together. For the particular circumstance of single-engined aircraft, a hybrid power plant has only one engine together with at least one electric motor.

By way of example, document FR 2 952 907 describes a hybrid power plant used on a single-engined aircraft having only one engine together with a first electric motor mechanically connected to the main rotor of the aircraft and a second electric motor mechanically connected to its tail rotor. That hybrid power plant also has a set of batteries for the purpose of storing the electrical energy needed for electrically powering the two electric motors.

Those electric motors may be used together with or as a replacement for the engine in order to drive the main and tail rotors. Furthermore, the electric motors are capable of operating in generator mode so as to transform mechanical power into electrical power and thus act as brakes for slowing down the rotors or indeed the engine.

Also known is document FR 2 962 404, which describes the electrical architecture of a hybrid power plant of a rotary wing aircraft. That power plant has at least one engine and at least one electric motor together with a main electricity network and an auxiliary electricity network. The main electricity network serves to provide the aircraft with its general electrical power supply, while the auxiliary electrical network is dedicated to the hybridizing system of the hybrid power plant.

Document EP 2 148 066 describes a hybrid power plant and a method of controlling such a power plant. That power plant has at least one turboshaft engine and at least one electric motor capable of acting together to drive a single main gearbox (MGB). The power delivered by the electric motor is added to the power from each engine.

Document US 2009/0145998 describes a rotary wing aircraft having a first driving power source constituted by a gas turbine and a second driving power source constituted by one or more electric batteries powering an electric motor. Those two power sources are capable of acting simultaneously or independently to drive one or more rotors.

Finally, document WO 2010/123601 describes a vertical takeoff and landing aircraft in which the rotor(s) is/are driven solely by a plurality of electric motors. That aircraft may include a plurality of electrical energy storage means, such as batteries or fuel cells.

In contrast, one of the major drawbacks of using electric motors is storing the electrical energy needed for them to operate. Several solutions exist for storing such electrical energy, e.g. batteries, thermal batteries, or supercapacitors, but each of those solutions has its own specific constraints.

For example, batteries are heavy or indeed very heavy if they are to store a large quantity of electrical energy, whereas supercapacitors are capable of delivering a high level of electrical power, but only for a very limited length of time. Furthermore, thermal batteries are for single use only and have a duration of operation that is limited once they have been activated.

Whatever the means used for storing electrical energy, the quantity of electrical energy that is available remains limited, even though the weight of the electrical energy storage means may be considerable.

Thus, the improvement in performance that it might be possible to achieve by using one or more electric motors within a power plant of an aircraft encounters several limitations associated with storing electrical energy. For example, it is necessary to find a balance between the improvement in the performance of the hybrid power plant and the increase in weight that results from using such means for storing the electrical energy needed to operate the electric motor(s).

BRIEF SUMMARY OF THE INVENTION

An object of the present invention is thus to provide a method of assisting a pilot of a single-engined rotary wing aircraft during a stage of flight in autorotation following a failure of the engine of that aircraft. The method thus enables the pilot to handle the failure safely, in particular in order to reach the stage of flight in autorotation and make an emergency landing with the main rotor in autorotation.

According to the invention, the assistance method is for a single-engined aircraft having a hybrid power plant with a single engine, at least one electric machine, and a main gearbox (MGB). The aircraft also has at least one electrical energy storage means for powering the electric machine and at least one main rotor driven in flight at a nominal speed of rotation by the hybrid power plant.

The term "speed of rotation" for the main rotor is usually used by the person skilled in the art to designate the frequency of rotation of the main rotor of an aircraft. This speed of rotation of the main rotor is then expressed in radians per second (rad/s), or in revolutions per minute (rpm).

Furthermore, during a flight, the main rotor of an aircraft rotates at a nominal speed of rotation, defined by the manufacturer of the aircraft, with a small amount of variation about the nominal speed of rotation nevertheless being possible.

Below, for simplification purposes, the term "speed of rotation" is used of the main rotor to designate the instantaneous speed of rotation of the main rotor, it being understood that during a flight, this instantaneous speed of rotation is equal to the nominal speed of rotation.

By default, an electric machine is a reversible machine. It can thus operate in motor mode, i.e. such that the electric machine transforms electrical power into mechanical power, and it can also operate in generator mode, i.e. such that the electric machine transforms mechanical power into electrical power. Furthermore, the electric machine may be a brushless motor.

The electric machine may be located in various positions within the hybrid power plant, as described in document FR 2 952 907. For example, it may be connected to the MGB, to the engine, or indeed directly to the main rotor of the aircraft.

The method of the invention is remarkable in that during a monitoring step, a monitoring parameter of the aircraft is monitored in flight in order to detect a failure, if any, of the engine. Thereafter, in the event of an engine failure being detected, the electric machine is controlled to deliver auxiliary power to the main rotor, thus serving to assist the pilot of the aircraft in maneuvering the aircraft safely during the stage of flight in autorotation that follows said failure of the engine.

In the event of a failure of the engine leading to a total loss of power drive to the main rotor, the single-engined aircraft needs to be controlled by its pilot to enter into a stage of flight in autorotation, this stage of flight in autorotation being a descent stage of flight without driving power, but with the aircraft remaining maneuverable. This entry into a stage of flight in autorotation needs to be performed very quickly, within one or two seconds of the engine failure appearing and it must be done by using a special procedure that seeks to maintain a predetermined speed of rotation for the main rotor. If the pilot of the aircraft does not respond rapidly to the failure, then the speed of rotation of the main rotor of the aircraft decreases very quickly until the main rotor stalls, i.e. until the main rotor no longer provides any lift at all, whereupon the aircraft falls without any possibility of being maneuvered until there is an accident.

The method seeks initially to assist the pilot in entering this stage of flight in autorotation by delivering auxiliary power to the main rotor.

At the moment the engine fails, the main rotor is no longer driven by the engine and driving power drops down to zero. The driving power delivered to the main rotor may be the monitoring parameter that is representative of failure of the engine. The rotation of the main rotor is then subjected to a high level of deceleration, and consequently its speed of rotation decreases progressively. The skill of the pilot is then to prevent the speed of rotation of the main rotor dropping any further and to seek to reach a speed of rotation for the main rotor that makes it possible to achieve a minimum sink rate.

After detecting the failure, the method controls the electric machine in motor mode, i.e. so that the electric machine delivers auxiliary mechanical power to the main rotor. This delivery of auxiliary power then serves to reduce the deceleration of the main rotor. The drop in the speed of rotation of the main rotor is thus not so fast, thereby giving the pilot more flexibility in the maneuver of recovering this speed of rotation of the main rotor. Entry into the stage of flight in autorotation of the aircraft is then quicker and easier for the pilot. In addition, this delivery of auxiliary power also makes it possible to increase the length of time available for entering into the stage of flight in autorotation by a few seconds, e.g. by one to two seconds.

Another critical instance following such a failure of the engine is landing the aircraft. With the main rotor in autorotation, the landing must also be performed by performing a specific maneuver that is difficult for pilots to perform, in particular in order to avoid making very rough contact with the ground. More precisely, at the end of the stabilized descent of the aircraft, the maneuver consists in raising the nose of the aircraft so as to reduce its forward speed and its descent speed, and then leveling the aircraft off again so as to make contact with the ground with an attitude that is substantially level.

The method thus seeks to assist the pilot in performing this landing, by delivering auxiliary power to the main rotor.

In order to reduce and then stop the speed of descent and the forward speed of the aircraft, the maneuver of leveling the aircraft off again must be accompanied by the pilot increasing the collective pitch of the blades of the main rotor so as to provide lift on a very temporary basis while causing the speed of rotation of the main rotor to drop very fast. In the short instant of the aircraft being leveled off and its collective pitch being increased, the power needed for flight drops and the only source of energy for the main rotor is its own kinetic energy of rotation. The method then detects this drop in the power of the main rotor by detecting this reduction in the speed of rotation of the main rotor, and it then controls the electric machine to operate in motor mode so as to deliver auxiliary mechanical power to the main rotor.

This delivery of auxiliary mechanical power has the effect of increasing the quantity of energy available to the main rotor, and consequently the quantity of energy available for reducing the speed of descent and the forward speed of the aircraft. The pilot thus has additional energy available for performing a landing without hitting the ground hard and while limiting the slip of the aircraft on the ground. On a priority basis, the pilot must reduce the speed of descent of the aircraft in order to achieve a landing without impact, since slip of the aircraft during such a landing, due to the aircraft having non-zero forward speed is less critical.

Finally, during descent in autorotation, the pilot may also request lift from the main rotor in order to maneuver the aircraft, in particular in order to avoid an obstacle, or to reach an appropriate landing ground. This request for lift from the main rotor is likewise accompanied by a reduction in the power available to the main rotor and consequently by a reduction in its speed. The method then detects this reduction in the speed of rotation of the main rotor and causes the electric machine to operate in motor mode so as to deliver auxiliary mechanical power to the main rotor. This auxiliary power delivered to the main rotor makes it possible to perform the maneuver requested by the pilot and to maintain the speed of rotation of the main rotor at the value required during a stage of flight in autorotation, also making it possible to reduce the sink rate of the aircraft.

However, when the aircraft is on the ground and the main rotor is rotating slowly, i.e. idling at a speed of rotation less than its nominal speed, it is appropriate to avoid triggering the method of the invention on the ground. This slow speed of rotation might otherwise be identified as being a drop in the power of the main rotor and consequently as representing a failure of the engine. In order to eliminate that possibility, it is then advantageous to make use of first information provided by information means present in the aircraft indicating that the aircraft has taken off in order to be sure that the main rotor has reached the nominal speed of rotation and thus allow the method to be executed, if necessary. This first information may thus be used to activate the method of the invention, with the information means being, for example, by a rotary knob, such as the knob for power regulation that might be present in the aircraft and that is activated solely in flight, or it may be any other avionic means of the aircraft.

In addition, it is appropriate to avoid triggering the method of the invention during special stages of flight requested by the pilot of the aircraft that are demanding in terms of aerodynamic load. When the pilot requests a large increase in the collective pitch of the blades of the main rotor, the speed of rotation of the main rotor may drop under the effect of these aerodynamic loads before the engine is capable of reestablishing the nominal speed of rotation of the main rotor.

In order to avoid this temporary drop in the speed of rotation of the main rotor resulting from this request being interpreted as a drop in the power of the main rotor, and consequently triggering execution of the method of the invention, it is advantageous to make use of second information indicative of this large request for collective pitch made by the pilot. This second information may thus be used to deactivate the method of the invention, and it may for example be delivered by the collective pitch control in the event of it being strongly maneuvered by the pilot of the aircraft.

In contrast, once the method of the invention has been engaged, i.e. once an engine failure has been detected, this second information should have no effect on the method and the electric machine should deliver the auxiliary power to the main rotor depending on the maneuvers requested by the pilot.

Thus, during a failure of the engine of a single-engined aircraft in flight, the method of the invention serves to assist the pilot in entering into a stage of flight in autorotation, in performing certain maneuvers during this flight in autorotation, and in landing by automatically delivering auxiliary power at appropriate moments, i.e. when so required by the piloting of the aircraft.

Furthermore, delivering this auxiliary power to the main rotor during the failure of the engine of the aircraft may make it possible firstly to increase the maximum authorized weight on takeoff of a single-engined aircraft and may also enable the flight envelope of the aircraft to be increased.

The maximum weight on takeoff of a single-engined aircraft may be limited by the performance of the aircraft during a stage of flight in autorotation, in particular in order to provide for the engine failing during a stage of takeoff.

As a result, the delivery of such auxiliary power serving to improve the performance of the aircraft during a stage of flight in autorotation, may also serve to increase the maximum weight authorized on takeoff.

Furthermore, the flight envelope of an aircraft is characterized, amongst other things, by a "height-velocity" diagram that determines the minimum horizontal velocity at which the aircraft must fly as a function of its height above the ground, and there is a zone in the diagram that needs to be avoided in which a stage of flight in autorotation cannot be performed all the way to a safe landing.

The term "height above the ground" is used to designate the position of the aircraft relative to the ground along a vertical axis. This term "height above the ground" is more appropriate than the term "altitude" which defines the position of the aircraft along such a vertical axis, but relative to sea level. Thus, the height above the ground defines the space available between the aircraft and the ground, e.g. as needed in order to perform an entry into a stage of flight in autorotation and then perform a landing after a failure of the engine.

Consequently, the delivery of this auxiliary power that improves the performance of the aircraft during a stage of flight in autorotation also makes it possible to reduce the zone of the height-velocity diagram that needs to be avoided, thereby increasing the flight envelope of the aircraft.

The flight envelope of an aircraft is also characterized by its sink rate during a stage of flight in autorotation. This sink rate then makes it possible to define the distance the aircraft can travel during a stage of flight in autorotation. Thus, the delivery of auxiliary power to the main rotor can enable the sink rate of the aircraft to be reduced. Consequently, the distance the aircraft can travel during a stage of flight in autorotation can be increased.

As a result, the flight envelope of a single-engined aircraft can be extended and the stage of flight in autorotation can be made safer by using the method of the invention, so the restrictions associated with such a single-engined aircraft can be reduced. For example, its maximum onboard weight may be increased. Likewise, since the distance the aircraft can travel during a stage of flight in autorotation is increased, the pilot of the aircraft can more easily find an appropriate landing ground, and can consequently be authorized to overfly large built-up areas.

The increase in this flight envelope is associated directly with the length of time it is possible to deliver the auxiliary power to the main rotor. In order to enter into a stage of flight in autorotation, the length of time this auxiliary power is used is of the order of a few seconds prior to autorotation of the main rotor becoming established. Similarly, in order to land in autorotation, the length of time this auxiliary power is used is of the order of a few seconds.

Thus, after the failure of the engine of the aircraft and until it has landed the method is activated at least twice, for a total duration of about 15 seconds firstly in order to achieve entry into the stage of flight in autorotation and secondly in order to land. The pilot of the aircraft may also use some of the available auxiliary power for avoiding an obstacle or for increasing the distance that can be traveled during this stage of flight in autorotation.

Advantageously, the method of the invention uses display means of the aircraft to display information relating to the available auxiliary power. The pilot of the aircraft is thus continuously informed about the amount of auxiliary power that is available and can thus manage this availability auxiliary power both to conserve the auxiliary power that will be needed for landing and also to avoid an obstacle or else to increase the distance that can be traveled during this stage of flight in autorotation in order to reach an appropriate landing ground.

By way of example, this information may be the length of time this auxiliary power can be used at its maximum level, which time is determined as a function of the electrical energy available in the storage means for powering the electric machine.

In the method, the display means also display an indication indicating whether the method is in operation. The method is in operation when it is capable of detecting a failure of the engine and when it is capable of delivering the required auxiliary power to the main rotor.

Firstly, the method may be operational only while the aircraft is in flight, as mentioned above. Furthermore, a switch present in the aircraft may enable the pilot to cause the method to be operational or non-operational. The method may also be non-operational as a result of damage or indeed as a result of a lack of electrical energy in the storage means. This indication indicating whether the method is operational may be a color used for displaying the information about the available auxiliary power, e.g. green when the method is operational and red when the method is not operational. Thus, when all the auxiliary power has been consumed, the display means displays an available utilization time for the auxiliary power as "0 seconds" displayed in red.

Furthermore, the available auxiliary power is a function of the quantity of energy available in the storage means present in the aircraft. Thus, the greater the storage means, the greater the amount of auxiliary power that is available, and consequently the greater the extent to which the flight envelope is increased. Furthermore, the maximum power that can be delivered by the electric machine also has an effect on increasing the flight envelope.

However, the electric machine and the electrical energy storage means can rapidly become very heavy, which is also harmful to the performance of an aircraft. It is therefore necessary to limit their weight in order to obtain a compromise between delivering auxiliary power in accordance with the method of the invention and increasing the weight of the aircraft.

Thus, the maximum auxiliary power needed for safely managing the failure of the engine of the single-engined aircraft, i.e. the maximum power that the electric machine can deliver, is of the order of 15% to 30% of the maximum power that the aircraft engine can deliver.

Furthermore, this auxiliary power is needed for a duration of about 15 seconds in order to be able to enter into the stage of flight in autorotation and in order to land the aircraft in complete safety. The storage means may be dimensioned to deliver this auxiliary power at its maximum value for no more than this duration of about 15 seconds in order to minimize its weight.

By way of example, the storage means may comprise at least one supercapacitor, i.e. a capacitor that is capable of delivering high power for a limited period of time, a thermal battery, that requires heat to be provided in order to deliver power, or indeed a rechargeable battery.

If the storage means has available electrical energy in excess of the minimum need for managing the failure of the engine, then the electric machine may also deliver auxiliary power during the flight of the aircraft in order to increase the power of the power plant, by adding its auxiliary power to the power of the engine. For this purpose, the pilot has a dedicated control for activating this auxiliary power, e.g. a switch, and the pilot can then use this auxiliary power during special stages of flight that are demanding, such as taking off with maximum onboard weight or when performing certain turning maneuvers under very high aerodynamic loading. This auxiliary power that is available in flight may also serve to increase the flight envelope of the single-engined aircraft.

Furthermore, the electric machine may be used in generator mode in order to transform mechanical energy delivered by the engine or indeed by the main rotor into electrical energy.

Consequently, with the electrical energy storage means comprising at least one rechargeable means for storing such electrical energy and for electrically powering the electric machine when it is operating in motor mode, the electric machine, when operating in generator mode, can be used to deliver electrical energy for the purpose of charging the rechargeable storage means.

Furthermore, at least one rechargeable storage means may also be used for providing the aircraft with its general electrical power supply, in particular before starting its engine, in order to start the engine, and in an emergency, whenever the main electricity generator of the aircraft is not delivering enough energy for the avionic equipment, thus enabling a flight to be continued safely. Each rechargeable storage means may then replace, in part or in full, the batteries conventionally used for the general electrical power supply of the aircraft powering in particular the instruments and the electrical equipment of the aircraft.

As a result, the electric machine in generator mode may deliver the electrical energy needed for operating the electricity network of the aircraft, e.g. via a voltage converter, then replacing at least in part or possibly in full the main generator or the starter-generator that is conventionally present in the aircraft, it then being possible for the starter-generator to be restricted to being merely a starter.

Advantageously, the increase in weight due to the electric machine and to the storage means is compensated at least in part by eliminating the batteries and the main generator that are conventionally present in the aircraft.

When the storage means are used both for electrically powering the electric machine and for the general electrical power supply of the aircraft, it is not possible to use all of the electrical energy available in the storage means for powering the electric machine. In emergency flights, after a failure of the engine or of the main electricity generator, some of that electrical energy is needed for powering flight instruments, among other things.

Some of the electrical energy available in the storage means is reserved for electrically powering such flight instruments, while the remainder of the available electrical energy can be delivered to the electric machine in order to deliver auxiliary power to the main rotor.

Furthermore, the method of the invention must quickly detect the instant at which the engine of the aircraft fails in order to deliver the auxiliary power to the main rotor as soon as possible.

The failure is characterized by a drop in the power of the main rotor, since it is no longer driven by the engine, and consequently by a drop in its speed of rotation. It is therefore possible to measure the speed of rotation of the main rotor in order to evaluate this drop in its power, where such a drop is representative of a failure of the engine, for the purpose of detecting such a failure, e.g. as soon as the speed of rotation of the main rotor reaches a first predetermined value that is less than the nominal speed of rotation of the main rotor.

Nevertheless, such a drop in the speed of rotation of the main rotor takes place while the rotation of the main rotor is being decelerated strongly, and that deceleration can be detected before the speed of rotation reaches said first predetermined value. In order to be more reactive, it is possible to detect such a failure of the engine as a function of the deceleration of the speed of rotation of the main rotor as well as a function of said speed of rotation.

Aircraft are conventionally provided with first measurement means for measuring the speed of rotation of the main rotor. It is then possible to determine the derivative of the speed of the rotation of the main rotor, i.e. to detect deceleration of the main rotor, by an algorithm that is simple and known.

In a preferred implementation of the invention, it is considered that the engine has failed when a first check power $W_C$ is positive, this first check power $W_C$ being obtained using the following first relationship:

$$W_C = \frac{W_{max}}{Nr_{t1} - Nr_{t2}} \left( Nr + k\frac{dNr}{dt} - Nr_{t2} \right)$$

$W_{max}$ being the maximum power that can be delivered by the electric machine, Nr being the speed of rotation of the main rotor, dNr/dt being the derivative of the speed of rotation Nr, and $Nr_{t1}$, $Nr_{t2}$, and $\underline{k}$ being positive coefficients that depend on the aircraft.

The coefficient $Nr_{t1}$ is less than the coefficient $Nr_{t2}$. As a result, the difference $(Nr_{t1} - Nr_{t2})$ is permanently negative.

Furthermore, $Nr_{t2}$ corresponds to the first predetermined value for the speed of rotation of the main rotor below which a failure is detected. Thus, as soon as the speed of rotation Nr of the main rotor is less than said first predetermined value $Nr_{t2}$, the difference $(Nr - Nr_{t2})$ is negative. During a failure, the main rotor is in a stage of deceleration, so the derivative dNr/dt of its speed of rotation is thus negative.

The expression $$\left( Nr + k\frac{dNr}{dt} - Nr_{t2} \right)$$

is negative, and consequently the first check power $W_C$ is positive, following a failure when the speed of rotation Nr of the main rotor is less than this first predetermined value $Nr_{t2}$. Furthermore, on the appearance of a failure, the main rotor is subjected to strong deceleration, so the absolute value of the derivative dNr/dt is large. As a result, the expression $$\left( Nr + k\frac{dNr}{dt} - Nr_{t2} \right)$$

can be negative, and consequently the first check power $W_C$ can be positive on the appearance of a failure even though the speed of rotation Nr of the main rotor is still above said first predetermined value $Nr_{t2}$. This makes it possible to detect a failure more quickly. The coefficient $\underline{k}$ is a coefficient for weighting the deceleration in the speed of rotation of the main rotor, and it thus serves to increase or decrease the effect of the derivative of the speed of rotation of the main rotor on detecting a failure. This coefficient $\underline{k}$ thus enables engine failure anticipation to be weighted.

Nevertheless, when the main rotor is in a stage of acceleration, e.g. as a result of the engine restarting or as a result of auxiliary power being delivered by the electric machine, the derivative dNr/dt is positive. Under such circumstances, the first check power $W_C$ can be negative while the speed of rotation Nr of the main rotor is still less than the first predetermined value $Nr_{t2}$. The acceleration of the main rotor then suffices to enable the main rotor to reach a speed that is faster than said first predetermined value $Nr_{t2}$.

When a failure is detected, the electric machine then delivers auxiliary power $W_e$ lying between a value zero and the maximum power $W_{max}$ that the electric machine can deliver. The auxiliary power $W_e$ is equal to the first check power $W_C$ when the first check power $W_C$ is less than the maximum power $W_{max}$, and the auxiliary power $W_e$ is equal to the maximum power $W_{max}$ when said first check power $W_C$ is greater than or equal to the maximum power $W_{max}$.

The use of two coefficients $Nr_{t1}$ and $Nr_{t2}$ thus makes it possible to increase the auxiliary power $W_e$ progressively, thereby avoiding a sudden changeover from a zero value to a maximum value for the auxiliary power as would otherwise occur if use were made only of the coefficient $Nr_{t2}$.

The electric machine must then deliver auxiliary power $W_e$ to the main rotor as soon as the failure is detected and when the pilot requests it after the appearance of the failure and until the aircraft has landed, such that the auxiliary power $W_e$ is delivered to the main rotor at any moment after the failure of the engine, in order to enter into the stage of flight in autorotation, in order to land the aircraft, and also in order to avoid an obstacle or indeed to increase the distance that the aircraft can travel. Concerning the entry into the stage of flight in autorotation, the strong deceleration of the rotation of the main rotor at the instant of the failure is the main reason for auxiliary power being delivered to the main rotor. Under other circumstances, it is the drop in the speed of rotation of the main rotor that causes the auxiliary power $W_e$ to be delivered since the deceleration is then smaller.

Furthermore, after this auxiliary power $W_e$ has been delivered, the speed of rotation of the main rotor increases and the first check power $W_C$ may become negative. Under such circumstances, the auxiliary power $W_e$ delivered to the main rotor is zero, since the main rotor has reached a speed of rotation that is sufficient to no longer have any need for this auxiliary power $W_e$.

It should be recalled that a main rotor of an aircraft in flight has a nominal speed of rotation that is predetermined by the manufacturer of the aircraft. The coefficient $Nr_{t1}$ then lies in the range 82% to 88% of this nominal speed of rotation, while the coefficient $Nr_{t2}$ lies in the range 93% to 98% of this nominal speed of rotation, while the coefficient $\underline{k}$ may vary over the range 1 to 6.

In a variant of this preferred implementation of the method, a failure of the engine is detected solely as a function of the speed of rotation of the main rotor. Under such circumstances, the first check power $W_C$ is still obtained using the first relationship, with the weighting coefficient $\underline{k}$ having a value of zero. The reactivity of failure detection is then degraded, but its reliability may be improved, since there is no need to calculate a derivative.

In another variant of this preferred implementation of the method, the engine of the aircraft is a turboshaft engine and the instantaneous speed of rotation of a compression turbine of the engine is obtained by second measurement means of the aircraft. In such an engine, the compression turbine that is used for compressing admission air is not mechanically connected to the free turbine that is used for driving the main rotor via the MGB. As a result, the compression turbine is not mechanically connected to the main rotor. As a result, in the event of a failure of the engine, the instantaneous speed of rotation of the compression turbine drops more quickly than the instantaneous speed of rotation of the main rotor. Consequently, the failure of the engine can be detected more quickly by using the deceleration of the compression turbine instead of the deceleration in the rotation of the main rotor.

It is then considered that the engine has failed when a second check power $W_{CT}$ is positive, this second check power $W_{CT}$ being obtained using the following second relationship:

$$W_{CT} = \frac{W_{max}}{NG_{t1} - NG_{t2}} \left( NG + k' \frac{dNG}{dt} - NG_{t2} \right)$$

$W_{max}$ being the maximum power that can be delivered by the electric machine, NG being the instantaneous speed of rotation of the compression turbine, dNG/dt being the derivative of the instantaneous speed of rotation of the compression turbine, and $NG_{t1}$, $NG_{t2}$, and k' being coefficients that depend on the aircraft. The coefficient $NG_{t1}$ is less than the coefficient $NG_{t2}$, which corresponds to a second predetermined value for the instantaneous speed of rotation of the compression turbine below which failure is detected, and the coefficient k' is a weighting coefficient for weighting the deceleration in the rotation of the compression turbine.

As in the preferred implementation of the invention, the second check power $W_{CT}$ is positive mainly during a strong deceleration of the compression turbine or else when its speed of rotation is less than the coefficient $NG_{t2}$.

Thus, when a failure is detected, the electric machine then delivers auxiliary power $W_e$ lying between a value of zero and the maximum power $W_{max}$. As above, the auxiliary power $W_e$ is equal to the second check power $W_{CT}$ so long as the second check power $W_{CT}$ is less than the maximum power $W_{max}$, and the auxiliary power $W_e$ is equal to the maximum power $W_{max}$ when said second check power $W_{CT}$ is greater than or equal to the maximum power $W_{max}$.

In contrast, the electric machine is controlled to deliver auxiliary power $W_e$ equal to the second check power $W_{CT}$ only during the first few instants of the failure, in order to assist the pilot on entering into the stage of flight in autorotation. The speed of the compression turbine will only continue to decrease after the failure, and entry into the stage of flight in autorotation has no effect on that speed. For other situations in which it may be useful for the electric machine to deliver auxiliary power $W_e$ i.e. when landing the aircraft in autorotation and when avoiding an obstacle or else increasing the distance that can be traveled by the aircraft, the electric machine is controlled to deliver auxiliary power $W_e$ equal to the first check power $W_C$.

Furthermore, the monitoring parameter of the aircraft that makes it possible to detect a failure of the engine may also be torque at the outlet from the engine as obtained by third measurement means such as a torque meter. During a failure of the engine, the drive power from the engine drops quickly, as does its torque. As a result, the failure of the engine is detected as soon as its torque becomes less than a third predetermined value. The electric machine is then operated to deliver auxiliary power $W_e$ equal to the first check power $W_C$.

When the engine of the aircraft is a turboshaft engine having a compression turbine, the monitoring parameter may also be the speed of the compression turbine. Since the compression turbine is not mechanically connected to the free turbine of such an engine, its instantaneous speed of rotation drops quickly as soon as a failure occurs, even though the instantaneous speed of rotation of the MGB, which is mechanically connected to the free turbine of the engine and to the main rotor, drops more slowly.

This failure of the engine is detected as soon as the instantaneous speed of rotation of the compression turbine becomes less than a fourth predetermined value. The instantaneous speed of rotation of the compression turbine is obtained by means of the second measurement means. Once more, the electric machine is then controlled to deliver auxiliary power $W_e$ equal to the first check power $W_C$.

Advantageously, each measurement means used for measuring the monitoring parameter may provide information that has little noise and that is sampled at short time intervals so as to enable the method of the invention to trigger the delivery of auxiliary power in reactive manner. For this purpose, each measurement means is preferably independent and dedicated to the method. The noise in the system for transmitting data, possibly coming from the measurement means itself, or indeed in the digital acquisition system, in particular noise due to electromagnetic disturbances, can be filtered and the derivative can be calculated using any algorithm that is simple, robust, and fast. For example, a first order filter followed by the derivative being calculated using Euler's formula serves to achieve good reactivity in the method of the invention.

It is also possible to anticipate a failure of the engine so as to prepare the electric machine for delivering auxiliary power to the main rotor. It is conventional for aircraft to include an electronic engine control unit (EECU) that is connected to the engine. The EECU monitors the operation of the engine and serves in particular to deliver the operating characteristics of the engine. In certain aircraft, the EECU is replaced by a full authority digital engine control (FADEC) computer. Such a FADEC engine computer has greater authority than an EECU and thus limits pilot action in the management of the engine.

The operating characteristics of the engine may be constituted for example by the temperatures and the pressures of the fluids in the engine.

A variation in these operating characteristics of the engine then makes it possible to identify when it is likely that a failure of the engine is going to happen soon. Advantageously, in the method of the invention, these operating characteristics are used to anticipate the detection of a failure of the engine, and the electric machine is prepared for delivering auxiliary power to the main rotor.

In order to prepare the electric machine for delivering such auxiliary power, the storage means may be activated beforehand, e.g. when the storage means comprise a thermal battery that requires a certain activation time before it can deliver the electrical energy it contains.

It is also possible to prepare the electric machine to deliver this auxiliary power by starting the electric machine in advance, e.g. when it is an electric machine connected to the MGB via a freewheel or overrunning clutch. It is then necessary to bring the electric machine up to the speed of rotation of the MGB before it can actually deliver any auxiliary power.

Furthermore, in order to reduce the need for auxiliary power, and consequently reduce the weight of the storage means, it is possible to limit use of the method of the invention as from a given height of the aircraft above the ground. Beyond a certain height above the ground, hovering flight is very rare, such that entry into a stage of autorotation is made easier given that the aircraft then has forward speed that is non-zero. Thus, the method may be operational only below a predetermined height above the ground of the aircraft. For example, this predetermined height above the ground may be 2000 meters (m).

The present invention also provides a rotary wing aircraft including a device for assisting a pilot of the aircraft during a stage of flight in autorotation, the aircraft being provided with a hybrid power plant that includes a single engine, at least one electric machine, and a main gearbox (MGB). The device also has at least one electrical storage means and control means for controlling the electric machine and including a memory.

The single-engined aircraft also has at least one main rotor driven in rotation by the hybrid power plant and rotating at a nominal speed of rotation in flight.

This device is remarkable in that the aircraft includes monitor means for monitoring a monitoring parameter of the aircraft in order to detect a failure, if any, of the engine, the control means communicating with the monitor means and with the electric machine in order to perform the above-described method.

By way of example, the monitoring parameter may be the power of the main rotor, which power drops in the event of a failure of the engine. This drop in power may be evaluated by means of the speed of rotation of the main rotor and also by means of the deceleration of the main rotor.

Thus, the monitor means comprise first means for measuring the speed of rotation of the main rotor making it possible to evaluate a drop in the power of the main rotor.

The control means may also include a calculation unit and a memory. The calculation unit then executes instructions stored in the memory in order to determine whether the engine has failed, and then in order to cause the electric machine to deliver auxiliary power to the main rotor, where appropriate, thus assisting the pilot of the aircraft in maneuvering the aircraft during a stage of flight in autorotation following the failure.

However, the auxiliary power is used only for assisting the pilot during the failure of the engine. The maximum power $W_{max}$ that the electric machine is capable of delivering may therefore be limited, thus also making it possible to limit its weight and its volume. By way of example, this power may be about 15% to 30% of the maximum power of the aircraft engine.

Furthermore, since the auxiliary power is used only for assisting the pilot during a failure of the engine, the length of time the electric machine is used can be limited, to about 15 seconds. As a result, the quantity of electrical energy present in the storage means can also be limited.

The capacity of the storage means for storing electrical energy, and consequently its dimensions, are then likewise limited. Advantageously, this makes it possible to limit the weight of the storage means.

By way of example, the storage means may comprise at least one rechargeable battery, at least one thermal battery, or indeed a supercapacitor.

Nevertheless, it may be advantageous for the storage means to contain a greater quantity of electrical energy. Thus, the pilot is able to use auxiliary power other than during a failure of the engine in order to increase the power of the single-engined aircraft. For this purpose, the pilot has a dedicated control for activating such auxiliary power, e.g. a switch, and the pilot can then use this auxiliary power during particular stages of flight that are demanding, such as taking off with maximum onboard weight or indeed when performing certain turning maneuvers under high aerodynamic loading.

In order to inform the pilot about the available auxiliary power, in particular in order to ensure that the pilot retains sufficient auxiliary power to handle a failure of the engine, the device of the invention may display information on display means of the aircraft. The device may also display an indication of the display means indicating whether the device is in operation.

For example, the information about the availability auxiliary power may specify a remaining length of time that the auxiliary power can be used at its maximum value $W_{max}$, which corresponds, in fact, to the amount of electrical energy available in the storage means for powering the electric machine.

In an embodiment of the device, the electric machine may act in generator mode and thus transform mechanical energy from the main rotor or from the engine into electrical energy. When the storage means includes at least one rechargeable electrical energy storage means, then the electric machine enables each rechargeable storage means to be charged.

The device may also include means for switching off the supply of electricity between the electric machine and the storage means. It is advantageous to be able to switch off the electrical circuit connecting these components together for safety reasons, so as to isolate the components, e.g. for the purpose of avoiding untimely delivery of power to the MGB, or indeed to protect the system against excessively high temperatures so as to avoid any risk of fire.

The electric machine may also be replaced for the purpose of delivering the auxiliary power by a motor that presents a source of energy other than electricity. For example, the electric machine may be replaced by a pneumatic motor or by a pyrotechnic motor. However, those types of motor are not reversible.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 1 is a block diagram of the method of the invention;

FIG. 2 shows a single-engined aircraft fitted with a device of the invention;

FIG. 3 shows display means of such a device;

Figure 4:
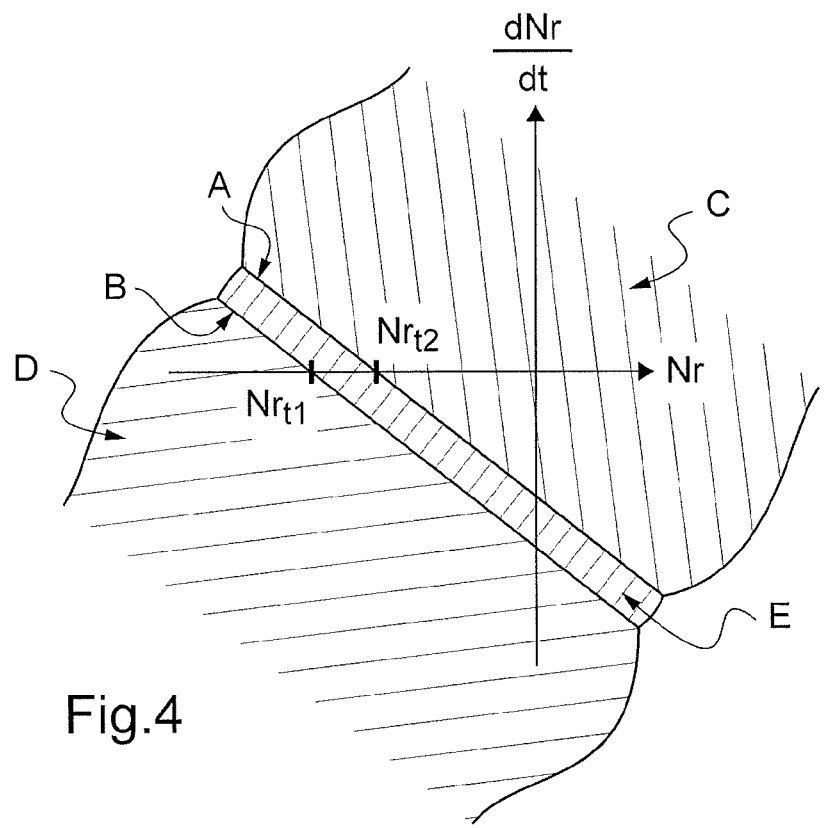
FIG. 4 is a graph showing the auxiliary power delivered by the device.

Elements present in more than one of the figures are given the same references in each of them.

DETAILED DESCRIPTION OF THE INVENTION

FIG. 1 shows a method of the invention for assisting a pilot of a rotary wing aircraft 1 during a stage of flight in autorotation. FIG. 2 shows a rotary wing aircraft 1 fitted with a device 10 of the invention for assisting a pilot of the aircraft 1 during a stage of flight in autorotation.

The method and the device 10 serves to assist the pilot in flying in the event of a failure of the engine of the aircraft 1, in particular in order to reach a stage of flight in autorotation safely and then make a safe landing.

Such a device 10 of the invention, as shown in FIG. 2, comprises a hybrid power plant 5 fitted with a single engine 13, with an electric machine 12 capable of delivering maximum power $W_{max}$, with a main gearbox (MGB) 11, and with an EECU control unit 19 that delivers the operating characteristics of the engine 13. The device 10 also has electrical energy storage means 14, and control means 15 for controlling the electrical machine 12, which control means include a calculation unit 17 and a memory 16.

The hybrid power plant 5 is suitable for driving rotation of a main rotor 2 of the aircraft 1, which main rotor rotates in flight at a nominal speed of rotation $Nr_N$. The aircraft 1 also has first measurement means 3 for measuring the instantaneous speed of rotation Nr of the main rotor 2, and display means 18. Below, this instantaneous speed of rotation Nr is referred to as the "speed of rotation Nr".

The method of the invention is made up of two steps. It has a monitoring first step 20 during which a monitoring parameter is measured in flight in order to detect a failure of the engine 13. Thereafter, during a second step 30, after a failure of the engine 13 has been detected, the electric machine 12 is operated to deliver auxiliary power $W_e$ to the main rotor 2, thereby assisting the pilot of the aircraft 1 in maneuvering the aircraft 1 during the stage of flight in autorotation that follows said failure.

During the monitoring step 20, it is possible to use the first measurement means 30 to measure the speed of rotation of the main rotor 2. In the event of the engine 13 failing, this speed of rotation Nr drops rapidly.

During the monitoring step 20, it is also possible to determine the derivative of this speed of rotation Nr, i.e. the deceleration in the rotation of the main rotor 2. During a failure of the engine 13, this drop in the speed of rotation Nr takes place under high deceleration. This deceleration can be detected immediately after the failure has occurred, whereas it is otherwise necessary to wait for the speed of rotation Nr to reach a first predetermined value in order to be certain that a failure has indeed occurred.

The calculation unit 17 then executes instructions stored in the memory 16 in order to determine whether the engine 13 has failed. It is thus considered that the engine 13 has failed in the event of a check power $W_C$ being positive, where the check power $W_C$ is obtained using the following relationship:

$$W_C = \frac{W_{max}}{Nr_{t1} - Nr_{t2}}\left(Nr + k\frac{dNr}{dt} - Nr_{t2}\right)$$

where $W_{max}$ is the maximum power that can be delivered by the electric machine 12, Nr is the instantaneous speed of rotation of the main rotor 2, dNr/dt is the derivative of the speed of rotation Nr, and $Nr_{t1}$, $Nr_{t2}$, and $\underline{k}$ are positive coefficients that depend on the aircraft 1.

During the monitoring step 20, other monitoring parameters may take the place of the speed of rotation Nr of the main rotor. For example, it is possible to use a torque meter 6 to measure torque at the outlet from the engine, with the value of this torque dropping quickly in the event of the engine failing. Likewise, when the engine of the aircraft is a turboshaft engine having a compression turbine, it is possible to use the speed of the compression turbine in order to detect failure of the turboshaft engine.

During the step 30, after a failure of the engine 13 has been detected, the calculation unit 17 executes instructions stored in the memory 16 so that the electric machine 12 delivers auxiliary power $W_e$ to the main rotor 2, thereby enabling the pilot of the aircraft 1 to be assisted in maneuvering the aircraft during the stage of flight in autorotation following the failure.

This auxiliary power $W_e$ lies between a value zero and the maximum power $W_{max}$. It is equal to the check power $W_C$ when the check power $W_C$ is less than the maximum power $W_{max}$, and the auxiliary power $W_C$ is equal to the maximum power $W_{max}$ when the check power $W_e$ is greater than or equal to the maximum power $W_{max}$.

The electric machine 12 is then in a motor mode of operation, i.e. it transforms electrical energy stored in the storage means 14 into auxiliary mechanical power.

Furthermore, the aircraft 1 shown in FIG. 2 also has information means 7 indicating that the aircraft 1 has taken off. When the aircraft 1 is on the ground, the main rotor 2 rotates slowly and this "idling" speed of rotation might be identified as being a drop in power from the main rotor 2, and consequently as a failure of the engine 13. The method of the invention cannot be triggered so long as the information means 7 do not indicate that the aircraft 1 has taken off. For example, the information means 7 may be a rotary knob, such as a power regulator knob that is activated only in flight.

FIG. 4 shows the auxiliary power delivered by the electric machine 12 as a function of the speed of rotation Nr of the main rotor 2 which is plotted along an abscissa axis while its derivative dNr/dt is plotted up an ordinate axis. The coefficients $Nr_{t1}$ and $Nr_{t2}$ define respectively two limits A and B, thereby defining three zones C, D, and E. The zone C lies above the limit A and the zone D lies below the limit B. In the zone C, the auxiliary power $W_e$ delivered by the electric machine is zero, while in the zone D, the auxiliary power $W_e$ is equal to the maximum power $W_{max}$. In the zone E that lies between the two limits A and B, the auxiliary power $W_e$ lies between a value zero and the maximum power $W_{max}$.

This zone E makes it possible to increase the auxiliary power progressively, thereby avoiding a sudden change from a value zero to maximum power $W_{max}$ as would occur if use were made only of a coefficient $Nr_{t2}$, and consequently only of the two zones C and D.

Furthermore, the auxiliary power $W_e$ that is to be delivered by the electric machine 12 is delivered in order to assist the pilot during the entry into the stage of flight in autorotation and on landing, the main rotor 2 being in autorotation. This electric machine does not replace the engine 13 for driving the main rotor 2. The maximum power $W_{max}$ from the electric machine 12 may therefore be limited. By way of example it may be about 15% to 30% of the maximum power that can be delivered by the engine 13.

Furthermore, the delivery of this auxiliary power to the main rotor 2 during a failure of the engine 13 may serve firstly to increase the maximum weight on takeoff of a single-engined aircraft 1, and secondly to increase the flight envelope of the aircraft 1.

The maximum weight on takeoff of a single-engined aircraft may be limited by the performance of that aircraft during a stage of flight in autorotation, in particular to allow for an engine failure during a takeoff stage.

As a result, the delivery of this auxiliary power that improves the performance of the aircraft during a stage of flight in autorotation can allow its maximum takeoff weight to be increased.

Figure 5:
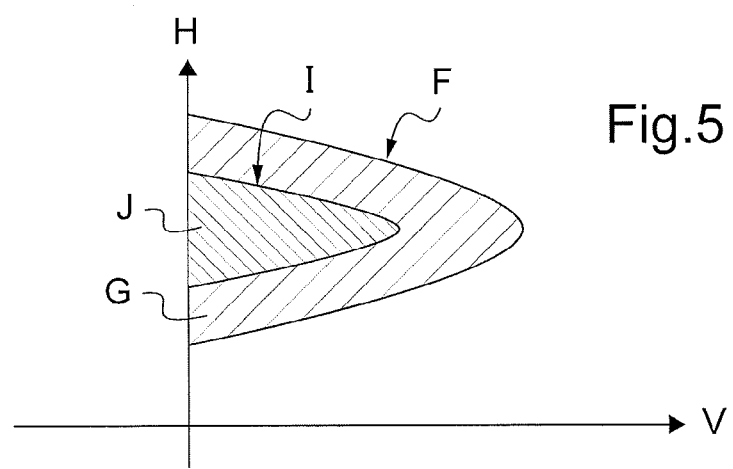
FIG. 5 is a graph showing the height-velocity domain of an aircraft.

Furthermore, the height-velocity diagram of the aircraft can also be varied when it is possible to use such auxiliary power. Thus, the height-velocity diagram F shown in FIG. 5 shows the minimum horizontal velocity that the aircraft 1 must perform plotted along the abscissa axis as a function of its height above the ground plotted up the ordinate axis. A zone G in the diagram F must be avoided since it is not possible in that zone to perform a stage of flight in autorotation safely.

Consequently, since the delivery of such auxiliary power improves the performance of the aircraft 1 during a stage of flight in autorotation, it is possible to make use of the height-velocity diagram I, thereby reducing the zone J that needs to be avoided in the height-velocity diagram, thereby increasing the flight envelope of the aircraft 1.

Furthermore, the length of time for which the electric machine 12 can be used for entering a stage of flight in autorotation and for landing is about 15 seconds. As a result, the dimensions of the storage means 14 may be limited, while still being capable of containing the quantity of energy that is necessary and sufficient. Consequently, the weight of the storage means 14 can likewise be limited.

In contrast, it may be advantageous to be able to make use of the auxiliary power also during the flight of the aircraft 1 in order to be combined with the power from the engine 13, e.g. for the purpose of performing certain maneuvers such as taking off with a maximum onboard weight or certain turn maneuvers under high aerodynamic landing.

For this purpose, the pilot may for example require auxiliary power to be delivered by means of a dedicated control, such as a switch, that is present in the aircraft 1.

Nevertheless, the pilot of the aircraft 1 must be certain that in the event of a failure of the engine 13, there will be sufficient auxiliary power $W_e$ available in order to manage the failure, so that the electric machine 12 can deliver the auxiliary power $W_e$ to the main rotor 2 during a period of at least 15 seconds.

The display means 18 of the aircraft 1, as shown in FIG. 3, serve to display information 21 about the amount of auxiliary power $W_e$ available in the storage means 14. By way of example, this information 21 may be added to the display means 18 that give the speed of rotation Nr of the main rotor 2 on a dial 23. It is also possible on the display means 18 to display an indication 22 indicating whether the method is operational.

For example, this information 21 may be the utilization time remaining for the auxiliary power $W_e$ at the maximum power $W_{max}$, and the indication 22 informing whether or not the method is in operation may be a color used for displaying the information 21.

The storage means 14 may thus be dimensioned at least to make it possible to assist the pilot during a failure of the engine 13, but it may also be capable of storing a larger quantity of electrical energy. Furthermore, the storage means 14 may be rechargeable or non-rechargeable.

For example, the storage means 14 may include at least one rechargeable battery, a thermal battery, or indeed a supercapacitor.

Furthermore, the electric machine 12 is a reversible machine equally capable of operating in motor mode or in generator mode. As a result, when operating in generator mode, the electric machine 12 may transform mechanical energy from the main rotor 2 or from the engine 13 into electrical energy.

In an embodiment of the invention, the electric machine 12, when operating in generator mode, may deliver electrical energy for charging the storage means, which must then be rechargeable and designed to deliver electrical power to the electric machine 12 and also to provide the aircraft 1 with its general electrical power supply.

Advantageously, the storage means 14, for use amongst other things in providing the aircraft 1 with its general electrical power supply, may then serve when the main electricity generator of the aircraft 1 is not delivering enough energy, or for starting the engine 13, or for delivering the general electrical power supply to the aircraft 1. As a result, the storage means 14 may replace the batteries that are conventionally used for general electrical power supply of the aircraft 1, and the electric machine 12 may replace the main electricity generator of the aircraft 1.

Omitting those batteries and the main electricity generator serves in part to compensate for the increase in weight due to the electric machine 12 and the storage means 14.

Nevertheless, in the event of these storage means 14 storing electrical energy both for powering the electric machine 12 and for powering the aircraft 1, it is not possible for all of that electrical energy to be used for the electric machine 12. During a failure of the engine 13 or indeed of the main electricity generator, it is still necessary for the flight instruments of the aircraft 1 to be powered. As a result, a portion of the electrical energy available in the storage means 14 must be reserved for electrically powering such flight instruments, even though the remainder of the available electrical energy may be delivered to the electric machine 12 in order to deliver auxiliary power to the main rotor 2. The display means 18 then display the information 21 while using the remainder of this available electrical energy.

In an implementation of the invention, it is possible to anticipate the appearance of a failure of the engine 13 in order to prepare the electric machine 12 for delivering the auxiliary power to the main rotor 2. This enables the auxiliary power to be delivered earlier, as soon as the failure is detected.

It is possible to make use of the operating characteristics of the engine 13, such as the temperatures and pressures of the fluids in the engine 13 as delivered by the EECU 19, and in particular variations of those values, in order to anticipate detection of such a failure of the engine 13.

Thereafter, in order to prepare the electric machine 12 for delivering the auxiliary power, it is possible in particular to begin by activating the storage means 14, e.g. in the event of the storage means 14 being a thermal battery that needs to be activated for a certain length of time before it is capable of delivering the electrical energy that it contains.

It is also possible to prepare the electric machine 12 to deliver this auxiliary power by previously starting the electric machine 12, e.g. in the event that it is connected to the MGB 11 via a freewheel. It is then necessary to bring the electric machine 12 up to the speed of rotation of the MGB 11 before it is actually capable of delivering auxiliary power.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of assisting a pilot of a rotary wing aircraft during a stage of flight in autorotation, said aircraft comprising:
    a hybrid power plant having a single engine, at least one electric machine, and a main gearbox;
    at least one electrical energy storage means; and
    at least one main rotor that is driven in flight at a nominal speed of rotation $Nr_N$ by said hybrid power plant;
    the method being characterized by the following steps:
    during a monitoring step, measuring in flight a monitoring parameter of said aircraft in order to detect a failure, if any, of said engine; and
    when a failure of said engine is detected, controlling said electric machine to deliver auxiliary power $W_e$ to said main rotor, thereby assisting said pilot of said aircraft in maneuvering said aircraft during said stage of flight in autorotation following said failure.

2. A method according to claim 1, wherein, for said aircraft having first measurement means for measuring an instantaneous speed of rotation Nr of said main rotor, said instantaneous speed of rotation Nr is measured during said monitoring step in order to evaluate a drop of power of said main rotor representative of said failure of said engine.

3. A method according to claim 2, wherein a derivative dNr/dt of said instantaneous speed of rotation Nr is determined during said monitoring step.

4. A method according to claim 3, that is considered that said engine has failed when a check power $W_C$ is positive, said check power $W_C$ being obtained using the following first relationship:

$$W_C = \frac{W_{max}}{Nr_{t1} - Nr_{t2}}\left(Nr + k\frac{dNr}{dt} - Nr_{t2}\right)$$

$W_{max}$ being the maximum power that can be delivered by said electric machine, Nr being said instantaneous speed of rotation of said main rotor, dNr/dt being the derivative of said instantaneous speed of rotation Nr, and $Nr_{t1}$, $Nr_{t2}$, and k being positive coefficients that depend on said aircraft, $Nr_{t1}$ being less than $Nr_{t2}$.

5. A method according to claim 4, wherein said coefficient $Nr_{t1}$ lies in the range 82.5% to 88% of the nominal speed of rotation $Nr_N$, and said coefficient $Nr_{t2}$ lies in the range 93% to 98.5% of said nominal speed of rotation $Nr_N$.

6. A method according to claim 1, wherein for said engine being a turboshaft engine having second measurement means for measuring an instantaneous speed of rotation NG of a compression turbine of said engine, it is considered that said engine has failed when the check power $W_C$ is positive, said check power $W_C$ being obtained using the following second relationship:

$$W_C = \frac{W_{max}}{NG_{t1} - NG_{t2}}\left(NG + k'\frac{dNG}{dt} - NG_{t2}\right)$$

$W_{max}$ being the maximum power that can be delivered by said electric machine, NG being said instantaneous speed of rotation of said compression turbine, dNG/dt being the derivative of said instantaneous speed of rotation NG, and $NG_{t1}$, $NG_{t2}$, and k' being positive coefficients depending on said aircraft, $NG_{t1}$ being less than $NG_{t2}$.

7. A method according to claim 1, wherein for said aircraft having third measurement means for measuring an outlet torque from said engine, during said monitoring step, said torque is measured in order to evaluate a drop in power from said engine representative of said failure of said engine.

8. A method according to claim 4, wherein said auxiliary power $W_e$ is equal to said check power $W_C$ when said check power $W_C$ is less than said maximum power $W_{max}$, and said auxiliary power $W_e$ is equal to said maximum power $W_{max}$ when said check power $W_C$ is greater than or equal to said maximum power $W_{max}$.

9. A method according to claim 1, wherein for said aircraft having display means, there is displayed on said display means information relating to said available auxiliary power $W_e$ together with an indication indicating whether said method is in operation.

10. A method according to claim 9, wherein said information is the remaining time for utilization of said auxiliary power $W_e$ at the maximum power $W_{max}$ that can be delivered by said electric machine.

11. A method according to claim 1, wherein said method is in operation only while said aircraft is in flight, with information means indicating that said aircraft has taken off.

12. A method according to claim 1, wherein said method is in operation only when said aircraft is below a predetermined height above the ground.

13. A rotary wing aircraft comprising:
    a device for assisting a pilot of said aircraft during a stage of flight in autorotation, the device being provided with:
    a hybrid power plant comprising a single engine, at least one electric machine, and a main gearbox;
    at least one storage means for storing electrical energy; and
    control means for controlling said electric machine, the control means having a memory; and
    at least one main rotor driven in rotation by said power plant and rotating at an instantaneous speed of rotation Nr;
    wherein the aircraft includes monitor means for monitoring a monitoring parameter of said aircraft in order to detect a failure, if any, of said engine, said control means communicating with said monitor means and with said electric machine in order to perform the method according to claim 1.

14. An aircraft according to claim 13, wherein said monitor means comprise measurement means for evaluating a drop in the power of said main rotor.

15. An aircraft according to claim 13, wherein said monitor means comprise first measurement means for measuring said instantaneous speed of rotation Nr in order to evaluate a drop of power of said main rotor.

16. An aircraft according to claim 13, wherein said control means comprise a calculation unit and a memory, said calculation unit executing instructions stored in said memory in order to determine whether there is a failure of said engine, and then to cause said electric machine, where appropriate, to deliver auxiliary power $W_e$ to said main rotor, thereby enabling said pilot of said aircraft to be assisted in maneuvering said aircraft during said stage of flight in autorotation following said failure.

17. An aircraft according to claim 13, wherein said aircraft includes display means for displaying information relating to said available auxiliary power $W_e$, together with an indication indicating whether said device is in operation.

* * * * *